(12) United States Patent
Thevenod

(10) Patent No.: US 9,359,916 B2
(45) Date of Patent: Jun. 7, 2016

(54) HEAT ENGINE WITH EXTERNAL HEAT SOURCE AND ASSOCIATED POWER GENERATION UNIT AND VEHICLE

(76) Inventor: Frédéric Oliver Thevenod, Paris (FR)

(*) Notice: Subject to any disclaimer, the term of this patent is extended or adjusted under 35 U.S.C. 154(b) by 505 days.

(21) Appl. No.: 13/519,753

(22) PCT Filed: Dec. 22, 2010

(86) PCT No.: PCT/FR2010/052868
§ 371 (c)(1),
(2), (4) Date: Oct. 2, 2012

(87) PCT Pub. No.: WO2011/080467
PCT Pub. Date: Jul. 7, 2011

(65) Prior Publication Data
US 2013/0186090 A1 Jul. 25, 2013

(30) Foreign Application Priority Data
Dec. 28, 2009 (FR) .................... 09 59624

(51) Int. Cl.
*F01K 27/00* (2006.01)
*F01K 23/00* (2006.01)
*F02G 1/04* (2006.01)
*F02G 5/02* (2006.01)

(52) U.S. Cl.
CPC . *F01K 23/00* (2013.01); *F02G 1/04* (2013.01); *F02G 5/02* (2013.01); *Y02T 10/166* (2013.01)

(58) Field of Classification Search
CPC ........... F01K 23/00; F01K 23/10; F02G 1/04; F02G 1/043; F02G 5/02; F02G 5/04; F02G 2260/00; F01N 5/02; Y02T 10/166; Y02T 10/16; Y02T 10/144; Y02T 10/146
USPC ........... 60/517, 643, 614, 615, 616, 618, 620, 60/624, 520, 597, 320, 604, 605.1, 668, 60/670, 676, 651
See application file for complete search history.

(56) References Cited

U.S. PATENT DOCUMENTS

| | | | |
|---|---|---|---|
| 3,708,979 A | 1/1973 | Bush et al. | |
| 4,962,645 A | 10/1990 | Morgan | |
| 5,311,739 A * | 5/1994 | Clark | 60/39.6 |
| 5,894,729 A | 4/1999 | Proeschel | |
| 6,672,063 B1 | 1/2004 | Proeschel | |
| 2002/0017098 A1 | 2/2002 | Johansson | |
| 2003/0145583 A1* | 8/2003 | Tanaka et al. | 60/298 |
| 2005/0257523 A1 | 11/2005 | Proeschel | |
| 2007/0204611 A1* | 9/2007 | Sawada et al. | 60/520 |
| 2009/0013686 A1* | 1/2009 | Yaguchi et al. | 60/597 |
| 2009/0094980 A1 | 4/2009 | Sawada et al. | |
| 2010/0083919 A1* | 4/2010 | Bucknell | 123/41.21 |

FOREIGN PATENT DOCUMENTS

| | | |
|---|---|---|
| FR | 2319010 | 2/1977 |
| FR | 2905728 | 3/2008 |

* cited by examiner

*Primary Examiner* — Jesse Bogue
*Assistant Examiner* — Kelsey Stanek
(74) *Attorney, Agent, or Firm* — Greer, Burns & Crain, Ltd.

(57) ABSTRACT

A heat engine includes structure for compressing a cooled working gas, heating the compressed working gas using an external heat source, expanding the heated compressed working gas, cooling the working gas using a heat exchanger with a cold source, and subsequently, returning the cooled working gas into the compression structure.

18 Claims, 4 Drawing Sheets

HEAT ENGINE WITH EXTERNAL HEAT SOURCE AND ASSOCIATED POWER GENERATION UNIT AND VEHICLE

The present invention relates to a heat engine with external heat source, associated power generation unit and vehicle. It further relates to the recovery of exhaust heat, in particular for applications on vehicles of any kind, in particular land, marine or air vehicles, but also for applications of stationary engines.

Different embodiments of heat engines operating an external heat source are known. These heat engines have however a low yield and a low (per mass and volume) power density.

Heat losses from internal combustion machines are the main cause for their small yield. Environmental awareness and legal restrictions as regards pollutant emissions prompt one to exploit the heat losses.

However, energy discharged at the exhaust is in the form of a gas having a low pressure and a relatively moderate temperature. Transforming this discharged energy into mechanical energy by usual means implies a heavy, bulky, expensive machinery having a questionable efficiency. In particular, for applications on vehicles wherein weight, bulk and engine costs play an important role.

From FR290572B, to the same inventor, there is known a heat engine with an external hot source able to transform heat from exhaust gases of an internal combustion machine into mechanical energy. Air taken from the atmosphere is compressed within a cylinder, sent into a heat exchanger, and then sent back into the cylinder where it is expanded producing mechanical energy collected by a piston, and then discharged to the atmosphere. The heat exchanger is placed in the exhaust gas flow of the internal combustion machine and plays the role of a pressure accumulator.

One object of the present invention is to provide a heat engine with an external hot source having improved yield and power density (per mass and volume).

A second object of the invention is to provide a heat engine with an external hot source the weight, bulk and cost of which are low.

A third object of the invention is to provide a heat engine able to utilise the energy discharged at the end of an internal combustion process, in particular compatible with an application to vehicles.

The invention provides a heat engine comprising compression means for compressing a working gas, an external heat source for heating the compressed working gas in a hot closed path, means for expanding the compressed heated working gas taken at an outlet of the hot closed path, characterised in that the expanded working gas is then sent to the compression means by a cool closed path passing through a heat exchanger with a cold source, in particular the atmosphere.

In this description of the invention, and in the following text, adjectives "hot" and "cool" in the terms "hot closed path" and "cool closed path" have a relative sense simply meaning that the hot closed path is generally hotter than the cool path upon operating the heat engine.

Thanks to this architecture, it is possible to directly reuse the residual pressure at the end of expansion to feed the intake, and thus to strongly reduce the negative work exhaust-compression loop in the pressure-volume diagram of the engine work cycle. The yield of the heat engine is optimized by recovering the pressure at the end of expansion. Since the pressure at the end of expansion is nearly wholly recovered as a pressure of the beginning of compression, it can be relatively high without problems. Therefore, the engine works with small working gas volumes and with a pressure difference which is relatively great between the hot closed path and the cool closed path. This architecture enables engine weight, bulk and cost to be restricted.

Preferably, the hot source of the heat engine comprises the exhaust from an internal combustion machine. The hot closed path then passes through a heat exchanger between the working gas and exhaust gases from the internal combustion machine.

The heat engine is thereby able to utilize the heat energy discharged at the end of an internal combustion process. The heat engine is especially compatible with an application to vehicles.

The hot source of the heat engine can also comprise an exhaust gas purifying catalyst of an internal combustion machine. This allows the use as a hot source of a chemical energy converted into heat energy thanks to the catalysis and combustion of residues in addition to heat energy discharged by the internal combustion machine.

The mechanical work provided by the heat engine can be directly used in the mechanical form, in particular for powering a vehicle. The mechanical work provided can also be used for driving an electrical current generator, in particular to make a thermal-electric hybrid vehicle.

In another aspect of the invention, a power shaft of the heat engine is connected to a power shaft of the internal combustion machine, or even to a transmission shaft.

This arrangement is particularly advantageous in that it enables power transmission elements common to the internal combustion machine and the heat engine to be provided. The coupling of the machine and the heat engine makes up a thermal-thermal hybrid machine. The yield of the hybrid machine, thanks to the work of the heat engine, is higher than that of an internal combustion machine used alone.

This arrangement also enables the machine to drive the heat engine when necessary, in particular to facilitate the start of the heat engine or to use the heat engine as a motor brake.

Most internal combustion machines have a rectilinear reciprocating motion. The invention proposes that the compression means and the expansion means of the heat engine each comprise at least one piston, having in particular a rectilinear reciprocating motion. Consequently, it is possible to achieve speeds of rotation substantially similar between the heat engine and the internal combustion machine. Weight, bulk and cost of the link between the power shaft of the heat engine and the power shaft of the internal combustion machine are thus reduced.

For the same object, the invention suggests that the compression means and expansion means should be made by at least one common piston.

The link between the power shaft of the heat engine and the power shaft of the internal combustion machine is preferably made through a clutch. The clutch allows the decoupling of the heat engine from the machine. The internal combustion machine can thus be used alone, without the heat engine, which can be temporarily of interest when the heat engine cannot produce torque enough.

Upon starting, the temperature rise of the machine and consequently of the hot source of the heat engine, gradually happens. The clutch enables the heat engine to be activated only in a delayed manner, once the machine, or more generally the hot source, is at temperature.

As long as the internal combustion machine has not reached its operating temperature, the maximum power available is lesser, the wear phenomena are increased, and the heat power available at the exhaust is low. The decoupling reduces the machine wear at the start, and increases the power available.

When the machine is only used for a brief period of time, then the heat engine has not time enough to produce a work higher than the work required to start it up by driving using the machine. The decoupling of the clutch enables thus the machine yield not to be degraded during brief uses outside optimal operation temperatures.

According to another aspect of the invention, the pressure in the cool closed path of the heat engine is, in a set operation, higher than the atmospheric pressure, in particular in the order of 0.1 to 1 MPa (1 to 10 bar).

To increase the working gas weight in the heat engine and compensate for possible leaks, the invention comprises a compressor able to inject working gas into the cool closed path.

Preferably, the heat engine comprises means for regulating the pressure in the cool closed path.

It can be contemplated according to the invention, a tank for containing a compressed working gas stock which can be selectively communicated with the cool closed path to initiate the pressure rise of the cool closed path upon starting the heat engine. This characteristic of the invention has the advantage of reducing the external energy supply necessary for starting the heat engine, and of shortening the duration of this starting phase.

The hot closed path can be selectively communicated with the tank, in particular for filling the tank. Control the selective communication takes the pressure in the hot closed path into account, in particular to maintain a sufficient pressure.

The invention also contemplates, upon filling the tank, to maintain a sufficient pressure in the hot closed path by flow rate adjusting means allowing the amount of gas to be higher upon entering the hot closed path than upon exiting therefrom. The flow rate adjusting means equip at least one inlet and one outlet of the hot closed path.

The flow rate adjusting means further allow a motor brake operation of the heat engine. The motor brake is then made with energy recovery through pressurized working gas accumulation. The energy stored by the motor brake can then be restored by the heat engine. Besides the presence of a motor brake, this feature of the invention has the advantage, for a heat engine which is not subjected to a continuous load, of optimizing the global yield.

When the power generation unit operates as a motor brake, the hot source is at least partially deactivated. By at least partially deactivated, it is meant that the heat energy amount transmitted by the hot source decreases in comparison with the operation of the activated hot source. Since the heat energy supply is lower, the increase in pressure in the hot closed path is also lower. A higher gas weight can thus be stored by avoiding any over pressure in the hot closed path, due to its lower temperature. This also aids in improving the global yield of the heat engine.

When the hot source of the heat engine comprises the exhaust of an internal combustion machine, the fuel feed to the machine is at least partially deactivated during the motor brake operation. Consequently, heat available at the exhaust of the internal combustion machine is reduced, which deactivates the hot source of the heat engine.

The motor brake of the internal combustion machine does not enable energy to be recovered. Thus, when the internal combustion machine is used as a motor brake, the energy absorbed can not be restored later by the internal combustion machine. Therefore, the absorbed energy is lost.

According to another aspect of the invention, the energy level in the hot source can be increased by operating in motor brake the heat engine driven by the internal combustion machine. Then, the machine provides to the heat engine, on the one hand, the energy enabling pressurized working gas to be accumulated, and on the other hand, heat necessary for the pressure rise in the hot closed path. The motor brake thus enables the pressure rise of the hot closed path to be speeded up, in particular upon starting the heat engine.

The invention also contemplates that the inlet and the outlet of the hot path be equipped with flow rate adjusting means allowing the power produced by the heat engine to be adapted to the power available at the hot source, in particular when the temperature of the hot source varies, in particular when the hot source comprises an exhaust of the internal combustion machine.

The flow rate adjusting means are typically dispensing means comprising at least one setting from: valve timing, duration, intake and/or exhaust opening. By valve timing, it is meant the timing for operating the dispensing means, in particular as regards the piston position of the heat engine.

For a heat engine comprising pistons having a linear reciprocating motion, the invention contemplates that the dispensing means comprise valves. According to an important aspect of the invention, the at least one valve located at the inlet of the hot closed path and/or the at least one valve located at the outlet of the hot closed path, comprise a head and a rod equipped with a pressure balancing piston. The balancing piston has a face facing the head and exposed to the pressure in the hot closed path, and a face facing away from the head and exposed to the pressure in a working chamber through a duct communicating the working chamber with a balancing chamber. A front face of the head, facing away from the rod, is exposed to the pressure in the working chamber. A back face of the head, facing towards the rod, is exposed to the pressure in the hot closed path.

Thus, the balancing piston undergoes on its two faces a pressure difference opposite to that undergone by the head. Resorting to a very high spring force to maintain the valve closed against the pressing force exerted onto the back face of the head by the gases of the hot closed path is thus avoided. Stresses exerted on the valve are therefore reduced, increasing the lifetime thereof and making controlling thereof easier.

Besides, the balancing piston enables to get rid of a so-called "reverse" valve actuation, that is wherein a valve opens not by moving forward in the working chamber, but by moving back in the channel.

The heat engine provided by the invention can use as a heat source the exhaust gases from an internal combustion machine. The association forms a mechanical power generation unit which can in particular be integrated as a motive source of an automotive vehicle.

The bulk, weight and cost of assembly are compatible with current requirements, whereas the specific consumption of the hybrid machine (fuel amount consumed per unit power and unit time) is particularly lowered.

Further advantages and features of the invention will appear upon reading the following description relating to non-limiting embodiments. In the appended drawings.

Figure 1:
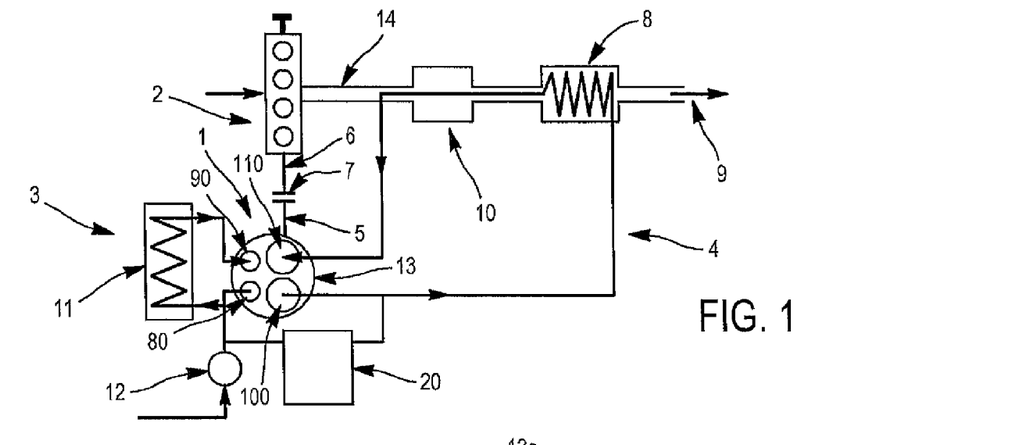
FIG. 1 schematically represents a mechanical power generation unit according to the invention.

The mechanical power generation unit represented in FIG. 1 comprises a heat engine 1 and an internal combustion machine 2. The heat engine comprises a circular piston 13 having a reciprocating rectilinear motion, connected to a power shaft 5.

Figure 10:
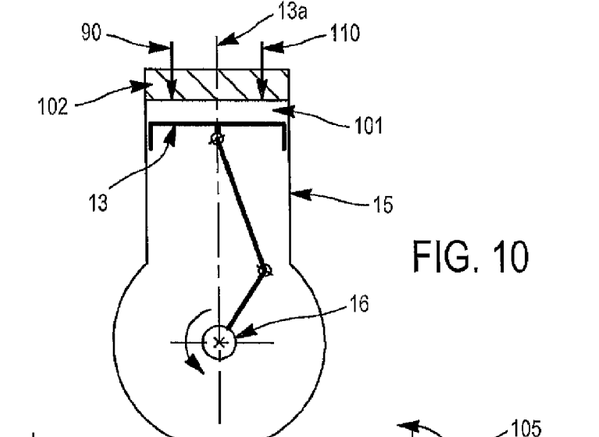

The circular piston 13, viewed from top in FIG. 1 and viewed in cross-section in FIG. 10, is sealingly and axially translationally movably mounted in a cylinder 15 having an axis 13a, common with that of the circular piston 13. Not represented in FIG. 1, but in a conventional manner, the circular piston 13 is connected to a crankshaft 16 integral with the power shaft 5, to transform the reciprocating motion of the circular piston into rotary motion of the crankshaft or conversely depending on the mechanical energy flow direction.

On the side away from the crankshaft, that is above the circular piston in the conventional representation of a positive displacement machine, the circular piston is adjacent to one working chamber 101 defined in the cylinder between the circular piston and a cylinder head 102. The cylinder head is provided with valves which are four in number: 80, 90, 100 and 110 which control corresponding ports in the cylinder head and the functions of which will be explained below. When all the valves are closed, the working chamber is hermetically closed and its volume varies as a function of the circular piston position along its rectilinear stroke in the cylinder.

The power shaft 5 of the heat engine and the power shaft 6 of the machine are connected through a clutch 7 selectively couplable and uncouplable. The heat engine includes for a working gas which can be air, a cool closed path 3 from the port controlled by the exhaust valve 80 to the port controlled by the intake valve 90, and a hot closed path 4 from the port controlled by a compression valve 100 to the port controlled by the expansion valve 110.

The hot closed path 4 passes through a heat exchanger 8 which allows a heat exchange between the working gas and exhaust gases 9 from the internal combustion machine. The hot closed path also passes through an exhaust gas purifying catalyst 10 of the internal combustion machine. The heat exchanger is counter-current, that is the hot closed path enters on the exhaust gas outlet side and exits therefrom on the exhaust gas inlet side. Then, the hot closed path passes through the catalyst 10 which is even hotter. Thus, when it comes back into the working chamber 101 of the heat engine, which chamber is bounded in the cylinder 15 between the circular piston 13 and a cylinder head 102, the working gas is at the temperature of the catalyst 10. The whole hot closed path is substantially isopressure, corresponding to the pressure in the working chamber at the beginning of the expansion phase.

The cool closed path passes through a heat exchanger 11 which allows a heat exchange between the working gas and the atmosphere as a cool source. A compressor 12 enables the working gas to be injected into the cool closed path.

In the preferred embodiment of FIG. 1, the circular piston 13 is a means for compressing working gas when its motion goes towards contracting the volume of the working chamber 101, and a means for expanding working gas when its motion goes towards expanding the volume of the working chamber.

The working gas compressed by the compression means penetrates the hot closed path through an inlet equipped with a dispensing means comprising a compression valve 100 and having a flow rate adjustment function. An outlet of the hot closed path is also equipped with dispensing means comprising an expansion valve 110 and having a flow rate adjustment function. The flow rate adjusting means according to the invention allow the amount of working gas entering and exiting the hot closed path to be adapted. To do this, the dispensing means having a flow rate adjustment function comprise at least one adjustment among: valve timing, duration, opening (passage cross-section) at the inlet and/or outlet of the closed path.

When the power available at the hot source is constant, if the flow of compressed working gas flowing between the inlet and the outlet of the hot closed path increases, the temperature and pressure in the hot closed path tend to decrease. Conversely, if the flow of compressed working gas flowing between the inlet and the outlet of the hot closed path decreases, the temperature and pressure in the hot closed path tend to increase.

If the flow of expanded working gas between the inlet and the outlet of the cool closed path increases, the temperature and pressure in the cool closed path tend to increase. If the flow of expanded working gas between the inlet and the outlet of the cool closed path decreases, the temperature and pressure in the cool closed path tend to decrease. The flow rate adjusting means enable the temperature and pressure to be varied in the hot closed path and cool path.

When the hot source comprises the exhaust 14 of the internal combustion machine, a variation in the speed of rotation and/or the load of the internal combustion machine causes a variation in the temperature of the hot source. A variation in the temperature of the hot source tends to cause a variation in the temperature and the pressure of the hot closed path. The power available at the hot source varies in the same direction as the hot source temperature.

A variation in the working gas flow between the inlet and the outlet of the hot closed path and/or the inlet and the outlet of the cool closed path causes a variation in the power produced by the heat engine. The flow rate adjusting means enable in particular to suit the power produced by the heat engine to be adapted to the power available at the hot source.

Besides the exchanger and the exhaust duct, ducts of the hot closed path are for example of the double wall type, providing maximum heat insulation.

Not represented here, the hot closed path can be equipped with a safety valve. In case of an overpressure in the hot closed path, part of the working gas is then released into the atmosphere to lower the pressure and preserve the engine.

At the outlet of the hot closed path, the compressed heated working gas provides a motive work in the expansion means. The expanded working gas thus partly cooled is then sent into the cool closed path and passes through the heat exchanger 3 with the cool source. The working gas expanded by the expansion means penetrates the cool closed path through inlet dispensing means 80. An outlet of the cool closed path is also equipped with outlet dispensing means 90.

The cool source will preferably be the atmosphere such as represented in FIG. 1. Alternatively and/or in addition, further cool sources can be selected, in particular for a fixed engine, a waterway, a hot water production plant, or in a vehicle, a system for heating the passenger compartment.

The working gas can be of different natures. The nature of the gas can be subjected to stresses or constraints, in particular legislative ones, and causes overexpenditures. This is why the atmospheric air is the preferred working gas according to the invention. In the case of a working gas leak, the invention contemplates to inject working gas in the cool closed path. In set operations, the pressure in the cool path is higher than the atmospheric pressure, in particular in the order of 0.1 to 1 MPa. Injecting working gas is performed through the compressor 12. Not represented means for regulating the pressure in the cool closed path enable the amount of gas to be injected to be automatically determined.

Injecting working gas into the cool closed path causes a sensitive pressure increase in the cool closed path. This increase in pressure can in particular be used to speed up starting of the heat engine.

The increase in pressure at the start of the heat engine can also be achieved by a tank 20 containing a compressed working gas stock. The tank is designed for its tightness to be higher than that of the hot and cool closed paths. When the heat engine remains inactive, the tank enables a compressed gas stock to be kept during a period from several hours to several days.

Pressurized working gas is fed to the tank by selectively communicating with the hot closed path. Since the communication takes in energy from the hot closed path, it is preferably performed when the pressure in the hot closed path is high and the heat engine is subjected to a moderate power demand. This communication can also be performed in the case of an over pressure in the hot closed path, before the opening of the safety valve.

Once the stock contains pressurized gas, this stock can be selectively communicated with the hot closed path and/or cool closed path according to a predefined management mode. In a preferential management mode, the cool closed path is fed by the working gas stock in particular upstream of the exchanger with the cool source. The communication of the stock with the cool closed path increases the pressure at the inlet of the compression means, and therefore increases the pressure at the outlet of the compression means in the hot closed path.

The restoration by the energy stock as pressurized working gas is not only for starting the heat engine, but can also be used when the heat engine requires extra power, for example when speeding up a vehicle. On the contrary, filling the stock, which corresponds to taking in an energy can be made when the heat engine is in low demand and/or when it operates in motor brake.

The motor brake is performed by recovering energy with pressurized working gas accumulation. The energy stored by the motor brake can then be restored by the heat engine. The motor brake is achieved thanks to the flow rate adjusting means allowing to cause a higher amount of gas to enter the hot closed path than to exiting therefrom.

The motor brake tends towards increasing the pressure in the hot closed path. This brake can thus be used to speed up start of the heat engine. If the heat engine is coupled to a machine, the machine then provides the energy required for the power shaft 5 whereas the heat available at the hot source tends to increase. Therefore, this creates an additional load on the machine.

In a set operation, the motor brake of the heat engine can be coupled to the motor brake of the internal combustion machine, in particular to slow down an automotive vehicle equipped with such a mechanical power generation unit. The hot source made up by the exhaust of the internal combustion machine is thus partly deactivated by the reduction in the heat available at the exhaust of the internal combustion machine.

When operated in motor brake, the internal combustion machine does not enable energy to be recovered. This is why the invention also contemplates that the mechanical power generation unit can provide motor brake only by the heat engine whereas the internal combustion machine is at least partly deactivated. Use of the motor brake of the internal combustion machine is made complementarily when more brake is required.

Known conventional dispensing means for machines resorting to valves can be used in the heat engine. However, in a heat engine according to the invention, there is in some operating phases a pressure much higher on the back face of the head of valves, in particular valves 100 and 110 associated with the hot closed path, than on the face of these valves which bound the working chamber. Therefore, a conventional assembly would require very powerful return springs. Such a solution imposes mechanical stresses that can alter the lifetime and controlling of the dispensing means. This is why the invention provides improved dispensing means represented in FIGS. 3 and 4.

Figure 3:
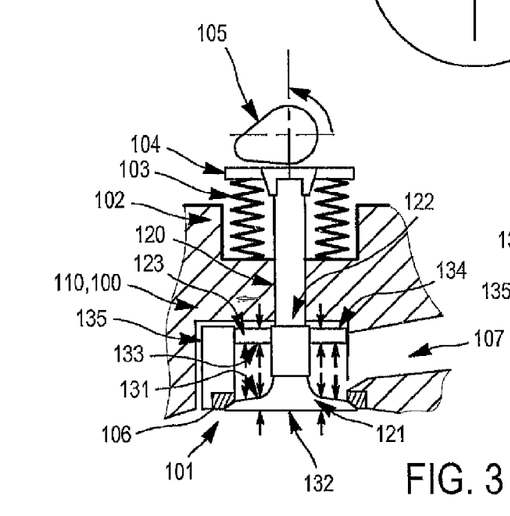
FIG. 3 is a longitudinal cross-section view of the dispensing means when a valve is closed.

The dispensing means comprise a valve 120 having a head 121 and a rod 122 equipped with a pressure balancing piston 123. FIG. 3 illustrates a closed valve. A front face 132 of the head, facing away from the rod, is exposed to the pressure in the working chamber 101. A back face 131 of the head, directed towards the rod, is exposed to the pressure in the hot closed path. The balancing piston has a face 133 directed towards the head and exposed to the pressure in the hot closed path. The balancing piston has also a face 134 away from the head and exposed to the pressure in the balancing chamber 136 which communicates with the working chamber through a duct 135. Thus, the pressure in the balancing chamber is substantially equal to the pressure in the working chamber.

The rod of the valve is slidably mounted in the cylinder head 102. A return spring 103, coaxial to the valve rod, is located between the cylinder head and a valve spring washer 104. The washer is integral with the valve rod so that the spring exerts on the valve a stress tending to close the valve. The valve is considered as closed when its head is pressed on a valve seat 106 integral with the cylinder head. A cam 105 pressing on the washer tends to open the valve and compress the spring. The cam is actuated according to known principles of the field of engine specifications so as to allow at least one flow rate adjusting among: valve timing, opening duration, opening of the valve. The valve opening is defined by the distance between the valve head and the valve seat.

Figure 4:
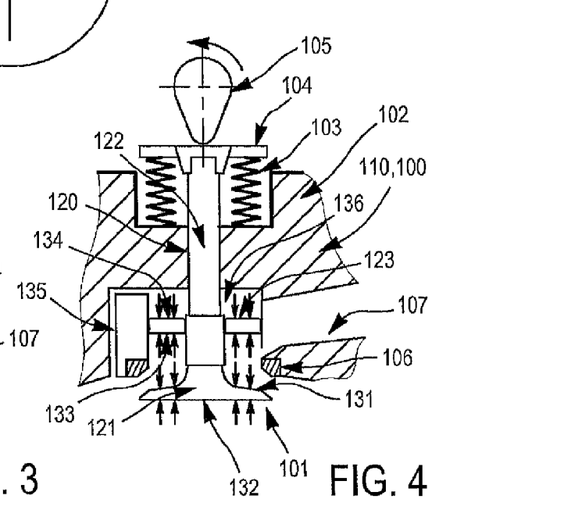
FIG. 4 is a longitudinal cross-section view of the dispensing means when a valve is open.

In the example of FIG. 3, the closed valve isolates the working chamber 101 by a channel 107 for entering the hot closed path or exiting from the hot closed path. Typically, the channel is at a pressure of 40 bars (4 MPa) whereas the pressure in the chamber ranges from 5 to 40 bars (0.5 to 4 MPa). When the pressure in the chamber is lower than the pressure in the duct, the valve head undergoes a pressure differential towards the valve opening. But the balancing piston integral with the valve rod undergoes a pressure differential towards the closing, having substantially the same value. Thus, a spring 103 exerting a moderate spring force is sufficient. When the cam presses on the washer 104, a low pressure is sufficient to open the valve. As soon as the valve is open, the pressure in the working chamber and in the duct balances. A same pressure is exerted on the faces of the valve head and the faces of the balancing piston, as illustrated in FIG. 4. The valve is thus free to slide towards closing under the action of the return spring.

Figure 2:
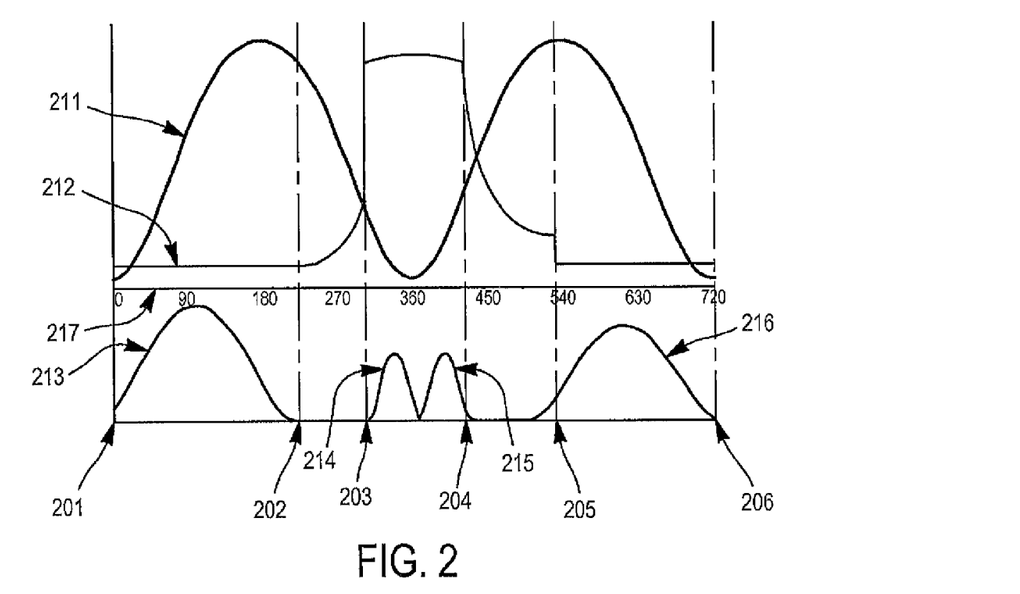
FIG. 2 is a diagram representing the volume of the working chamber, the pressure in the working chamber and the opening of valves depending on the angular position of the heat engine shaft.

The opening of valves, the volume 211 of the working chamber and the pressure 212 in the working chamber are represented in FIG. 2 as a function of the angular position 217 of the power shaft of the heat engine. FIG. 2 represents a cycle of the heat engine in a set operation. The angular position 0° corresponds to the beginning of the intake phase. During intake, the valve 90 for exiting from the cool closed path is open, whereas the volume 211 increases. The volume of working gas contained in the cool closed path is much higher than the volume of the working chamber. The pressure at the intake of the working chamber is equal to the pressure in the cool closed path. This pressure remains substantially constant during intake. The closing 202 of the valve 90 is the end of the intake phase and the beginning of the compression phase.

During compression, all the valves are closed, the volume of the working chamber decreases and the pressure increases. The communication 203 of the chamber with the hot closed path is performed before the volume of the chamber is minimum. This communication is made by opening 214 the valve 100. At this stage, the pressure in the chamber is lower than the pressure in the hot closed path. The opening 214 thus generates an abrupt increase in pressure in the working chamber. The volume of the chamber keeps on decreasing, ensuring the transfer and compression of the working gas it contains towards the hot closed path. The valve 100 is substantially closed when the working chamber reaches its minimum volume.

The opening 215 of the valve 110 at the outlet of the hot closed path allows the intake of the compressed heated working gas in the chamber the volume of which increases. The closing of the valve 110 is the beginning 204 of the expansion phase of the compressed heated working gas. During this expansion, the volume of the chamber increases whereas the pressure and temperature in the chamber decrease. While the volume of the chamber approaches its maximum value, the opening 216 of the valve 80 is the beginning 205 of an outlet phase of the working gas into the cool closed path. This opening of the valve 216 begins with an abrupt but slight decrease in pressure in the working chamber, whereupon the volume of the working chamber decreases which causes the gas to be transferred into the cool closed path. The pressure is substantially constant during transfer. The closing 206 of the valve 80, when the volume of the working chamber reaches its minimum value is the end of this outlet phase, and corresponds to the beginning of a new intake phase.

FIG. 2 represents a typical cycle of the heat engine for a set operation. Not represented here, valves can be open or closed in a substantially different manner than represented, in particular upon starting the heat engine.

However, preferentially, the opening of the valve for exiting from the hot closed path will substantially precede the closing of the valve for entering the hot closed path so as to maintain communication with the chamber during valve crossing (brief period during which valves are simultaneously open, to optimize gas dynamics). Also preferentially, the opening of the valve for exiting from the cool closed path will substantially precede the closing of the valve for entering the cool closed path so as to maintain communication with the chamber during valve crossing.

FIGS. 5 to 9 represent pressure-volume diagrams of a heat engine according to the invention comprising a single working chamber providing the compression means and expansion means. These figures show the start of the heat engine with the pressure rise of the hot and cool closed paths. The start represented here is sequentially performed, with first in FIGS. 5 to 7 a pressure rise of the hot closed path without heat transfer, and then in FIG. 8 the temperature rise of the hot source, and finally the pressure rise of the cool closed path. The volume values in abscissa are indicated in cubic centimetres, and the pressure values in ordinates are indicated in bars.

Figure 5:
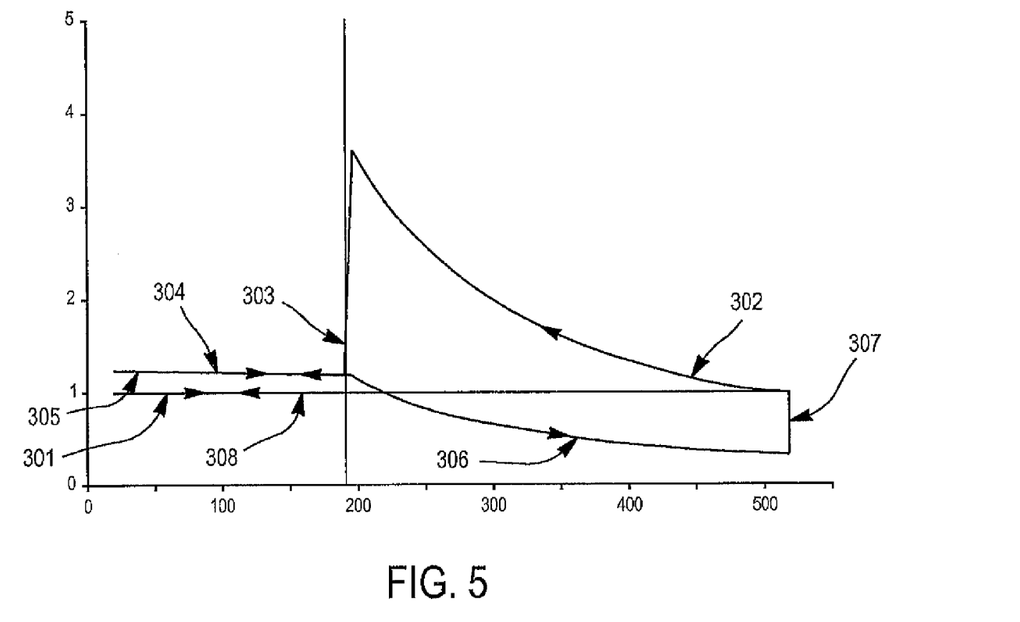
FIGS. 5 to 9 represent pressure-volume diagrams showing the pressure rise of the heat engine, and FIG. 10 schematically represents a cross-section view of the heat engine.
Figure 6:
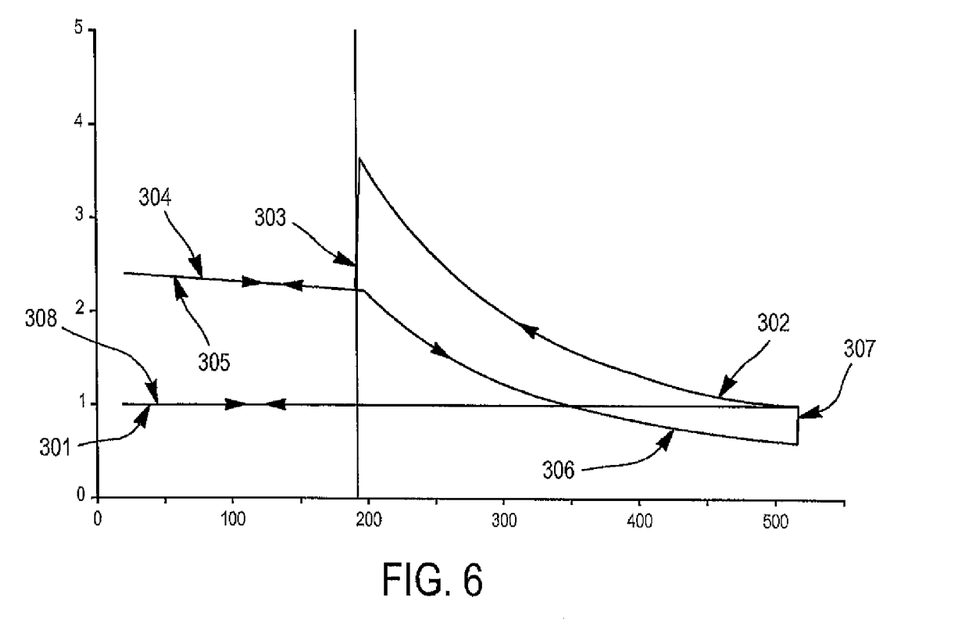
Figure 7:
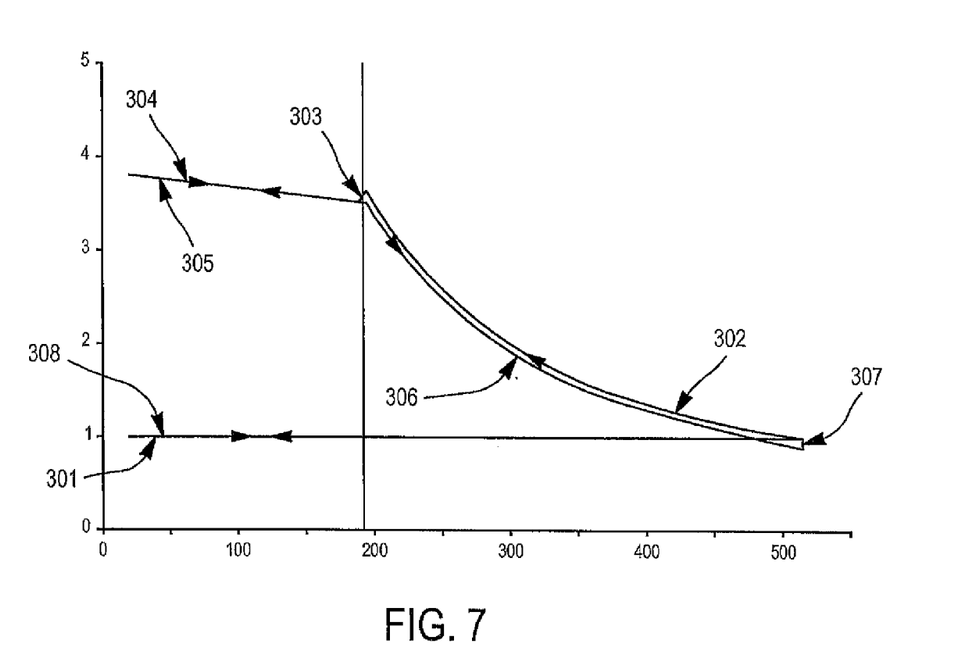

The pressure rise of the hot closed path illustrated in the example of FIGS. 5 to 7 is performed whereas the cool closed path communicates with the atmosphere through the compressor 12. FIG. 5 represents the start cycle of the heat engine.

The intake 301 of working gas in the heat engine is isobarically made until the chamber reaches its maximum volume. Then, the direction of the piston motion is inverted whereas the valve for exiting from the cool closed path is closed and an adiabatic compression 302 is operated until the valve for entering the hot closed path is open 303. But the hot closed path is at atmospheric pressure. This is why as illustrated in FIG. 5, the opening of the means for communicating with the hot closed path produces an abrupt decrease 303 in pressure in the chamber. The volume of the hot closed path being remarkably higher than the volume of the working chamber, the subsequent piston motion till the minimum volume of the working chamber is a substantially isobaric injection 304 of the fresh working gas in the hot closed path.

Then, the valve for entering the hot path is closed and the valve for exiting from the hot closed path is open. A slight isothermal expansion 305 occurs. Due to the crossing of valves for entering and exiting the hot closed path. The isothermal compression 304 and the isothermal expansion 305 of the working gas seem superimposed on the diagrams. The valve for exiting the hot closed path, the expansion is substantially adiabatically performed 306. When the heat engine is in a start phase, and the pressure in the hot closed path is low, the pressure at the end of expansion is lower than the atmospheric pressure.

The cool closed path is at atmospheric pressure. Opening the valve for entering the cool cold path causes an abrupt increase 307 in pressure in the chamber. Since the chamber communicates with the cool closed path, the exhaust 308 is substantially isobarically made. In the diagram, the exhaust 308 thus seems to be superimposed with the intake 307.

When starting as illustrated in FIG. 5, the engine thermodynamic cycle is described in the anticlockwise direction. The engine benefits from an external energy supply to provide the pressure rise of the hot closed path. At the end of this first cycle, the pressure in the hot closed path is substantially higher than the pressure in the cool closed path.

FIG. 6 represents the tenth cycle after starting. FIG. 6 only differs from FIG. 5 in that the pressure has increased in the hot closed path. The area of the thermodynamic cycle of FIG. 6 is substantially lower than the area of the cycle of FIG. 5. The energy supply to the engine during the tenth start cycle is thus lower than during the first start cycle.

FIG. 7 represents the fiftieth cycle after starting the machine. The pressure in the hot closed path reaches 3.5 bars upon closing the outlet valve. The adiabatic compression 302 and the adiabatic expansion 306 are practically superimposed. The area of the thermodynamic cycle is low, but it is always described in the anticlockwise direction. The energy consumption by the heat engine is however very low.

Figure 8:
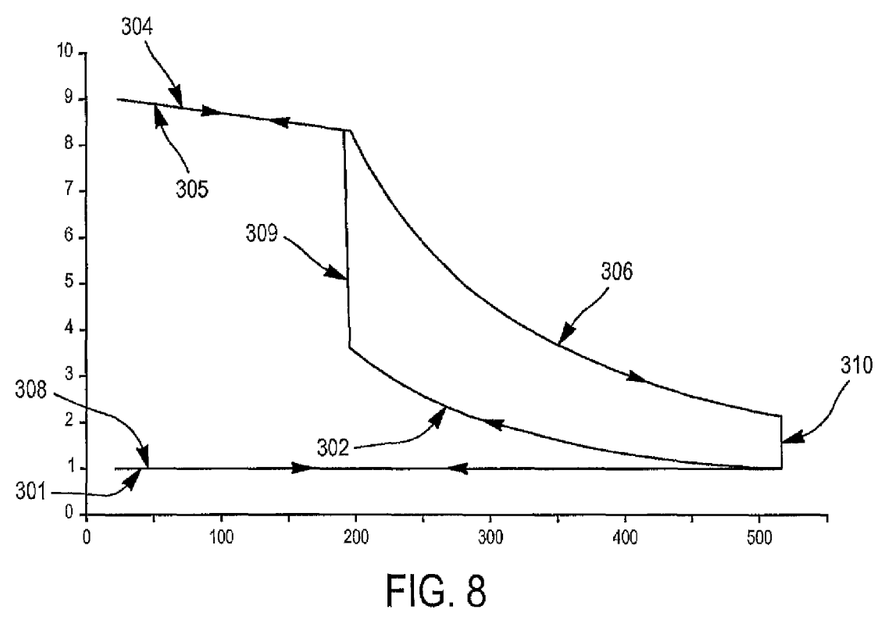

After the cycle represented in FIG. 7, the hot source is activated. This transfer enables pressure in the hot closed path to be increased. Each cycle introduces compressed fresh air into the hot closed path, promoting the pressure increase. The pressure in the hot closed path continues to increase. FIG. 8 represents the diagram of the heat engine after 70 cycles, that is 20 cycles with heat transfers. At the end of the adiabatic compression 302, the pressure in the hot closed path is higher than the pressure in the chamber. The opening of the inlet valve of the hot closed path causes an abrupt pressure increase 309 in the chamber. At the end of the expansion 306, the pressure in the chamber is higher than the pressure in the cool closed path. Opening the inlet valve of the cool closed path causes an abrupt decrease 310 in pressure in the chamber. the thermodynamic cycle is traveled in the clockwise direction, then the heat engine produces a positive work.

Figure 9:
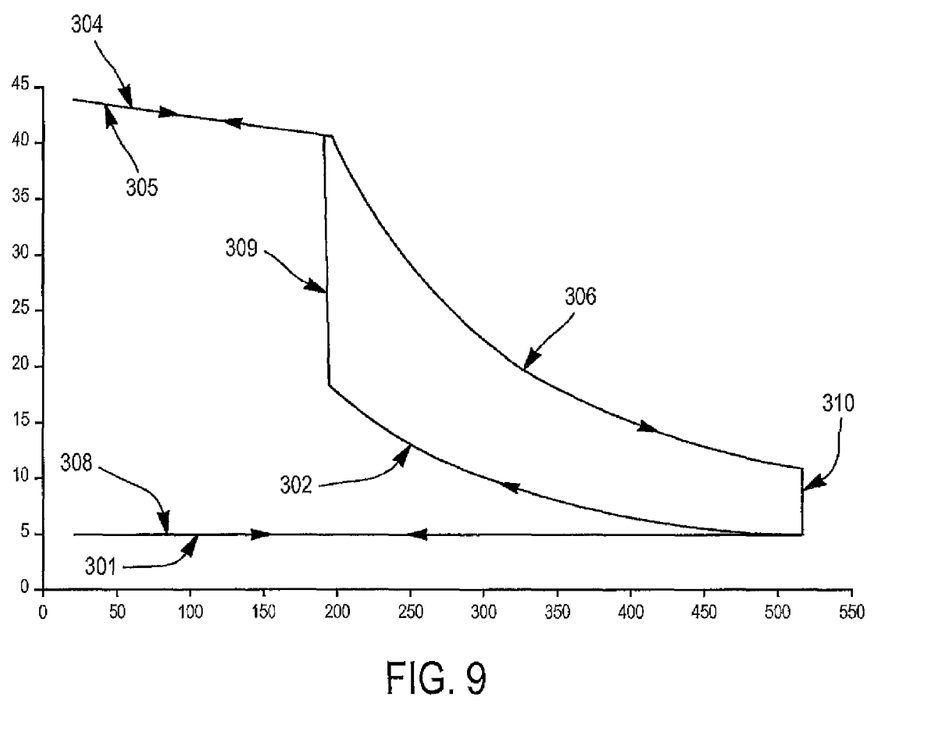

After the cycle represented in FIG. 8, the pressure is raised in the cool closed path, in particular through release of the working gas contained in the tank 20. The pressure of the working gas taken into the working chamber 101 through the valve 90 increases. Therefore, the pressure at the end of compression and in the hot closed path increases. FIG. 9 represents the diagram of the heat engine after 90 cycles, that is 20 cycles with the cool closed path at a pressure higher than the atmospheric pressure. Opening the inlet valve of the hot closed path causes an abrupt increase in pressure in the chamber up to a value of 40 bars. The pressure in the cool closed path is set to 5 bars.

At the end of the adiabatic compression 302, the pressure in the hot closed path is higher than the pressure in the chamber. Opening the inlet valve of the hot closed path causes an abrupt increase in pressure in the chamber. At the end of the expansion 306, the pressure in the chamber is higher than the pressure in the cool closed path. Opening the inlet valve of the cool closed path causes an abrupt decrease 310 in pressure in the chamber.

In another aspect or in addition thereto, being not represented here, starting the engine is performed through heat transfer from the hot source.

The mechanical power generation unit according to the invention can be modelled the following way:

$$P_D = M_{ECH} \times C_{ECH} \times (T_E - T_A)$$

$$P_U = P_D \times (T_E - T_S)/(T_E - T_A)$$

With:

$P_D$, heat power available at the exhaust of the internal combustion machine, $P_U$, useful heat power that can be extracted from the exhaust of an internal combustion machine, $M_{ECH}$, exhaust gas mass flow rate, $E_{CH}$, exhaust gas mass heat capacity, $T_E$, temperature in Kelvin of the exhaust gases when they enter the hot exchanger 8, $T_S$, temperature in Kelvin of the exhaust gases when they exit from the hot exchanger 8, $T_A$, temperature of the cool source in Kelvin, herein the atmospheric pressure.

For an exhaust gas inlet pressure of 900° C., the following yields can be assessed:

$$\eta_{REG} = P_U/P_D \approx 70\%$$

$$\eta_C = P_P/P_E \approx 42\%$$

$$\eta_G = P_U/P_D \times \eta_{ECH}$$
$$= \eta_C \times \eta_C \times \eta_E$$
$$= 42\% \times 70\% \times 94\% \approx 28\%$$

With:

$\eta_{REG}$, regeneration yield, $\eta_C$, cycle yield, $\eta_G$, global yield, $\eta_{ECH}$, heat exchanger yield, $\eta_{EXT}$, extracted yield, $\eta_E$, heat exchanger yield, $P_P$, power produced, $P_E$, useful operable power that can be extracted from the exhaust from an internal combustion machine, For a heat engine associated with a gasoline internal combustion machine having a displacement of 1.8 L delivering 96 kW at 6000 rpm, associated with a heat engine having a displacement of 1.0 L, and taking the constraints of the heat exchanger and the drive of dispensing means into account, the following values can be typically considered:

Exhaust gas flow rate: 340 kg/h

Working gas flow rate in the hot closed path: 410 kg/h

Working gas flow rate in the cool closed path: 485 kg/h

Exhaust gas temperature at the inlet of the exchanger: 900° C.

Exhaust gas temperature at the outlet of the exchanger: 310° C.

Exhaust gas heat capacity at constant pressure: Cp=1.25

Working gas heat capacity at constant pressure: Cp=1.12

Hot closed path pressure: 40 bars

Cool closed path pressure: 5 bars

Inlet temperature of the hot closed path: 280° C.

Outlet temperature of the hot closed path: 810° C.

Inlet temperature of the cool closed path: 220° C.

Outlet temperature of the cool closed path: 50° C.

Exhaust gas heat power: 103 kW

Heat transfer of the exhaust gas to the working gas in the heat exchanger of the hot closed path: 67 kW Heat transfer of the working gas to the atmosphere in the heat exchanger of the cool closed path; 24 kW Heat transfer by cooling the compression means: 15 kW Mechanical power delivered: 28 kW at 6000 rpm Specific torque; 53 Nm/l Specific power sensitivity: 30 kW/l at 6000 rpm Global yield: 28%.

In this example, the working chamber goes through a non-zero minimum volume which prevents all the working gas contents in the chamber from passing through hot and cool closed paths. Upon communicating the chamber with the hot closed path, the pressure in the chamber is higher than that upon communicating with the cool closed path. The gas mass which remains in the working chamber when the working chamber is at its minimum value is not the same at the end of compression and at the end of exhaust. This is why the flow rate in the hot closed path tends in this example to be substantially lower than the flow rate in the cool closed path.

Of course, the invention is not restricted to the examples just described and numerous alterations can be made to these examples without departing from the scope of the invention.

In an alternative not represented, the power shaft 5 of the heat engine and the power shaft 6 of the machine are connected by a mechanical joint or a gear.

In another alternative not represented, the link between the power shaft 5 of the heat engine and the power shaft 6 of the machine includes a gear box with at least two ratios.

When the compression and expansion means are discrete, they can alternatively or in addition be made by Moineau type linear engines or else, or even turbine engines, especially mechanically connected to the power shaft of the heat engine.

In an embodiment not represented, the cool closed path is provided with communication means selectively enabling the cool closed path to be communicated with atmosphere.

Starting the heat engine can be simultaneously performed, that is the temperature rise of the hot source and the pressure rise of the cool and hot closed paths can be simultaneously made, in particular upon starting the heat engine.

It can also be contemplated to begin the pressure rise of the cool and hot paths before starting the heat engine, in particular under the action of the compressor 12 and the communication of the tank 20. This solution has the advantage of allowing a quicker start of the heat engine, and a better energy recovery from the hot source enabling a global yield equivalent to a sequential start.

In the case of a generation unit according to the invention applied to an automotive vehicle, the pressure rise of the heat engine can thus be initiated as soon as the vehicle doors are open, or as soon as the vehicle is switched on, or even in a predetermined manner by the user.

The control and driving of the intake means can resort to systems known to those skilled in the art in the field of the internal combustion machines. The driving of the intake means can in particular be performed by means of a so-called "Desmodromic" control or even a so-called "Camless" electromagnetic control.

Other management modes for the working gas stock in the tank 20 can be contemplated. In an alternative management made provided by the invention, the stock is first communicated with the hot closed path, towards increasing the pressure in the hot closed path. When an equilibrium is reached, the tank is isolated from the hot closed path and then communicated with the cool closed path.

In another management mode of the working gas stock in the tank 20, the stock is simultaneously communicated with the hot and cool closed paths, preferably together with the action of the compressor 12. This management mode enables the heat engine to be started with an initial pressure higher than the atmospheric pressure in the hot and cool closed paths.

The invention claimed is:

1. A heat engine, comprising: compression means for compressing a working gas, an external heat source for heating the compressed working gas in a first heat exchanger of a hot closed path, means for expanding the compressed heated working gas taken at an outlet of the hot closed path, the expanded working gas is then sent to the compression means by a cool closed path passing through a second heat exchanger with a cold source, in particular the atmosphere,
  wherein an inlet and the outlet of the hot closed path are equipped with flow rate adjusting means allowing the amount of gas entering the hot closed path to be higher than that exiting therefrom, for a motor brake operation with energy recovery through pressurized working gas accumulation.

2. The heat engine according to claim 1, wherein the compression means and the expansion means each comprise at least one piston, in particular having a rectilinear reciprocating motion.

3. The heat engine according to claim 2, wherein the compression means and the expansion means are made by at least one common piston.

4. The heat engine according to claim 1, wherein the heat source comprises an exhaust of an internal combustion machine, the hot closed path passing through the first heat exchanger between the working gas and exhaust gases from the internal combustion machine.

5. The heat engine according to claim 4, further comprising a heat engine power shaft connected to an internal combustion machine power shaft, in particular through a clutch.

6. The heat engine according to claim 1, wherein the heat source comprises an exhaust gas purifying catalyst of an internal combustion machine.

7. The heat engine according to claim 1, wherein the pressure in the cool closed path is, in a set operation, higher than the atmospheric pressure, in particular in the order of 0.1 to 1 MPa (1 to 10 bar).

8. The heat engine according to claim 7, further comprising a pressure regulator in the cool closed path.

9. The heat engine according to claim 7, further comprising a tank for containing a compressed working gas stock which can be selectively communicated with the cool closed path to initiate the pressure rise of the cool closed path upon starting the heat engine.

10. The heat engine according to claim 1, further comprising a compressor configured for injecting working gas in the cool closed path, in particular to compensate for leaks.

11. The heat engine according to claim 9, wherein the hot closed path can be selectively communicated with the tank, in particular for filling the tank.

12. A mechanical power generation unit, comprising an internal combustion machine and a heat engine according to claim 1.

13. An automotive vehicle comprising as a motive source a mechanical power generation unit according to claim 12.

14. The heat engine according to claim 1, wherein during the motor brake operation, the hot source is at least partially deactivated.

15. The heat engine according to claim 14, wherein the hot source is made up of an exhaust of an internal combustion machine, and wherein the hot source is deactivated by reducing heat available at the exhaust of the internal combustion machine itself operating in motor brake.

16. The heat engine according to claim 1, wherein the flow rate adjusting means are dispensing means comprising at least one adjustment among: valve timing, duration, intake opening and exhaust opening.

17. A heat engine, comprising: compression means for compressing a working gas, an external heat source for heating the compressed working gas in a first heat exchanger of a hot closed path, means for expanding the compressed heated working gas taken at an outlet of the hot closed path, the expanded working gas is then sent to the compression means by a cool closed path passing through a second heat exchanger with a cold source, in particular the atmosphere,
  wherein an inlet and the outlet of the hot closed path are equipped with flow rate adjusting means enabling the power produced by the heat engine to be adapted to the power available at the heat source, in particular when the heat source comprises an exhaust of an internal combustion machine.

18. A heat engine, comprising: compression means for compressing a working gas, an external heat source for heating the compressed working gas in a first heat exchanger of a hot closed path, means for expanding the compressed heated working gas taken at an outlet of the hot closed path, the expanded working gas is then sent to the compression means by a cool closed path passing through a second heat exchanger with a cold source, in particular the atmosphere; and
  a valve having a head and a rod equipped with a pressure balancing piston at the inlet and the outlet of the hot closed path, a back face of the head, directed towards the rod, being exposed to the pressure in the hot closed path, the balancing piston having a face facing the head and exposed to the pressure in the hot closed path, and a face away from the head and exposed to the pressure in a working chamber through a duct communicating the working chamber with a balancing chamber, a front face of the head, away from the rod, being exposed to the pressure in the working chamber.

\* \* \* \* \*